United States Patent
Lin et al.

(10) Patent No.: US 12,249,086 B2
(45) Date of Patent: *Mar. 11, 2025

(54) METHOD FOR MEASURING GROWTH HEIGHT OF PLANT, ELECTRONIC DEVICE, AND STORAGE MEDIUM

(71) Applicant: HON HAI PRECISION INDUSTRY CO., LTD., New Taipei (TW)

(72) Inventors: Tzu-Chen Lin, New Taipei (TW); Jung-Hao Yang, New Taipei (TW); Chih-Te Lu, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 449 days.

This patent is subject to a terminal disclaimer.

(21) Appl. No.: 17/571,878

(22) Filed: Jan. 10, 2022

(65) Prior Publication Data
US 2022/0222837 A1    Jul. 14, 2022

(30) Foreign Application Priority Data
Jan. 12, 2021 (CN) .......................... 202110037833.5

(51) Int. Cl.
*G06T 7/50* (2017.01)
*G02B 7/04* (2021.01)
(Continued)

(52) U.S. Cl.
CPC .................. *G06T 7/50* (2017.01); *G02B 7/04* (2013.01); *G06F 18/214* (2023.01);
(Continued)

(58) Field of Classification Search
CPC ........ G06N 20/00; G06N 20/10; G06N 20/20; G06V 20/70; G06V 20/176; G06V 20/188;
(Continued)

(56) References Cited

U.S. PATENT DOCUMENTS

2010/0322477 A1* 12/2010 Schmitt .................. G06V 20/64
                                                                348/222.1
2017/0071188 A1*  3/2017 Rees ................... A01M 7/0089
(Continued)

FOREIGN PATENT DOCUMENTS

CN            107016697 A       8/2017

OTHER PUBLICATIONS

Xu K, Li H, Cao W, Zhu Y, Chen R, Ni J. Recognition of weeds in wheat fields based on the fusion of RGB images and depth images. IEEE Access. Jun. 12, 2020;8:110362-70. (Year: 2020).*

(Continued)

*Primary Examiner* — Oneal R Mistry
*Assistant Examiner* — Duy Tran
(74) *Attorney, Agent, or Firm* — ScienBiziP, P.C.

(57) ABSTRACT

A method for measuring a growth height of a plant, an electronic device, and a storage medium are provided. The method controls a camera device to obtain a color image and a depth image of a plant to be detected. The color image is detected by a detection model which is pre-trained, and a plurality of detection boxes which includes a plurality of plants to be detected is obtained. The color image and the depth image are aligned to create an alignment image. A plurality of target boxes is acquired from the alignment image, and depth values of the plurality of target boxes are determined. The quantity of the target boxes and a height of one or more plants to be detected are determined, no manual operations are required.

17 Claims, 4 Drawing Sheets

(51) Int. Cl.
    *G06F 18/21*       (2023.01)
    *G06F 18/214*     (2023.01)
    *G06K 9/62*       (2022.01)
    *G06N 20/00*      (2019.01)
    *G06T 7/30*       (2017.01)
    *G06T 7/70*       (2017.01)
    *G06T 7/90*       (2017.01)
    *G06V 10/22*      (2022.01)
    *G06V 20/10*      (2022.01)
    *G06V 20/70*      (2022.01)
    *H04N 5/232*     (2006.01)
    *H04N 23/60*     (2023.01)

(52) U.S. Cl.
CPC .......... *G06F 18/217* (2023.01); *G06N 20/00* (2019.01); *G06T 7/30* (2017.01); *G06T 7/70* (2017.01); *G06T 7/90* (2017.01); *G06V 10/225* (2022.01); *G06V 20/188* (2022.01); *G06V 20/70* (2022.01); *H04N 23/60* (2023.01); *G06T 2207/10024* (2013.01); *G06T 2207/20081* (2013.01); *G06T 2207/30188* (2013.01); *G06T 2207/30242* (2013.01); *G06T 2207/30244* (2013.01)

(58) Field of Classification Search
CPC ...... G06V 10/20; G06V 10/22; G06V 10/225; G06V 30/19; G06V 30/19013; G06T 7/10; G06T 7/20; G06T 7/30; G06T 7/50; G06T 7/70; G06T 7/536; G06T 7/55; G06T 7/32; G06T 7/33; G06T 7/344; G06T 7/90; G06T 7/97; G06T 7/80; G06T 7/73; G06T 7/75; G06T 2207/10024; G06T 2207/20081; G06T 2207/30188; G06T 2207/30242; G06T 2207/30244; G06F 18/217; G06F 18/214; G06F 18/24; G06F 18/241; H04N 23/60; H04N 23/741; G02B 7/04; G02B 15/14
See application file for complete search history.

(56) References Cited

U.S. PATENT DOCUMENTS

2018/0330166 A1* 11/2018 Redden ................ G06V 20/188
2020/0073389 A1* 3/2020 Flajolet ................ G05D 1/689
2020/0178483 A1* 6/2020 Devecigil ............... G06T 7/001

OTHER PUBLICATIONS

Nguyen TT, Slaughter DC, Max N, Maloof JN, Sinha N. Structured light-based 3D reconstruction system for plants. Sensors. Jul. 29, 2015; 15(8):18587-612. (Year: 2015).*

Syed, Tabinda Naz, et al. "Seedling-lump integrated non-destructive monitoring for automatic transplanting with Intel RealSense depth camera." Artificial Intelligence in Agriculture 3 (2019): 18-32.

Yin, Fukun, and Shizhe Zhou. "Accurate Estimation of Body Height From a Single Depth Image via a Four-Stage Developing Network." Proceedings of the IEEE/CVF Conference on Computer Vision and Pattern Recognition. 2020.

* cited by examiner

METHOD FOR MEASURING GROWTH HEIGHT OF PLANT, ELECTRONIC DEVICE, AND STORAGE MEDIUM

FIELD

The present application relates to a technical field of image analysis, and more particularly to a method for measuring a growth height of a plant, an electronic device, and a storage medium.

BACKGROUND

To increase yield and quality of plants, it is helpful to determine a better planting method for plants by analyzing a daily growth of the plants, thereby reducing planting costs. Measuring the growth height of the plants accurately is necessary.

DETAILED DESCRIPTION

The accompanying drawings combined with the detailed description illustrate the embodiments of the present disclosure hereinafter. It is noted that embodiments of the present disclosure and features of the embodiments can be combined, when there is no conflict.

Various details are described in the following descriptions for a better understanding of the present disclosure, however, the present disclosure may also be implemented in other ways other than those described herein. The scope of the present disclosure is not to be limited by the specific embodiments disclosed below. Unless defined otherwise, all technical and scientific terms used herein have the same meaning as commonly understood by one of ordinary skill in the art to which the present disclosure belongs. The terms used herein in the present disclosure are only for the purpose of describing specific embodiments and are not intended to limit the present disclosure.

Figure 1:
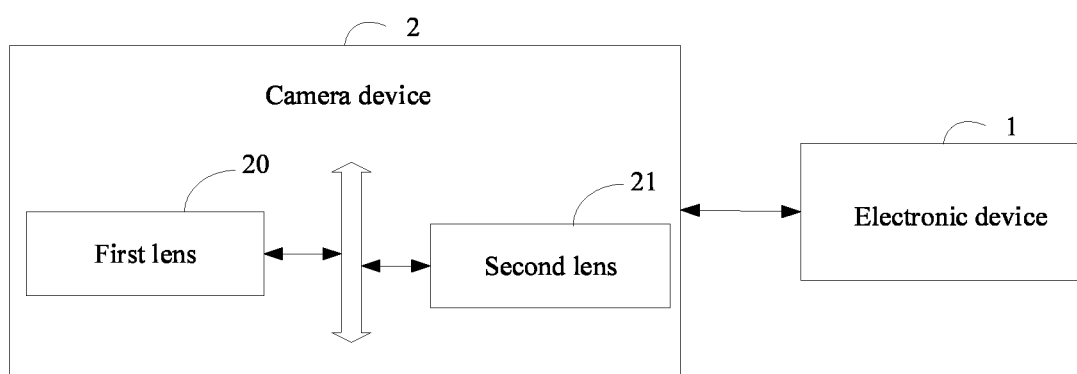
FIG. 1 is a block diagram of a camera device in communication with an electronic device in an embodiment of the present application.

FIG. 1 is a block diagram of a camera device in communication with an electronic device in an embodiment of the present application. As shown in FIG. 1, a camera device 2 communicates with an electronic device 1, and the camera device 2 includes a first lens 20 and a second lens 21. The first lens 20 can capture color images, and the second lens 21 can capture depth images.

Figure 2:
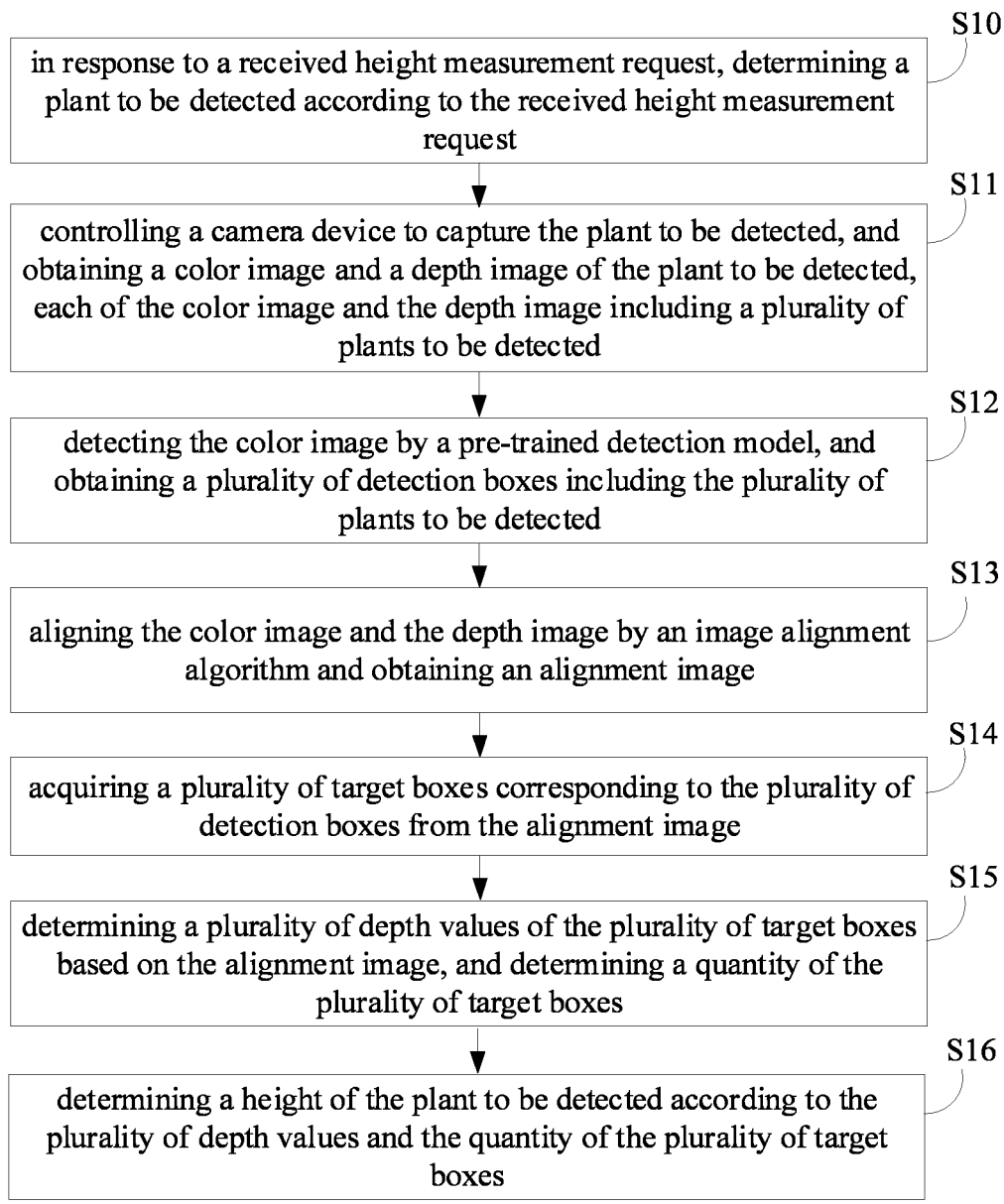
FIG. 2 is a flowchart diagram of a method of measuring a growth height of a plant in an embodiment of the present application.

FIG. 2 is a flowchart diagram of a method for measuring a growth height of a plant in an embodiment of the present application.

In one embodiment, the method for measuring a growth height of a plant may be applied to one or more electronic devices 1. The electronic device 1 includes hardware such as, but is not limited to, a microprocessor and an Application Specific Integrated Circuit (ASIC), a Field-Programmable Gate Array (FPGA), a Digital Signal Processor (DSP), embedded devices, for example.

The electronic device 1 may be any electronic product that can interact with a user, such as a personal computer, a tablet computer, a smart phone, a personal digital assistant (Personal Digital Assistant, PDA), a game console, an interactive network television (Internet Protocol Television, IPTV), or smart wearable device, for example.

The electronic device 1 may also include a network device and/or a user device. The network device includes, but is not limited to, a single network server, a server group including multiple network servers, or a cloud including a large quantity of hosts or network servers based on a cloud computing technology.

A network, which includes the electronic device 1, can include, but is not limited to, the Internet, a wide area network, a metropolitan area network, a local area network, and a virtual private network (Virtual Private Network, VPN), for example.

In block S10, in response to a received height measurement request, the electronic device 1 determines a plant to be detected according to the received height measurement request.

In one embodiment, information carried in the height measurement request includes a plant identifier, and a name of the plant to be detected, for example.

Moreover, the plant to be detected may be any plant that needs to be analyzed for daily growth, such as roses, sunflowers, or rice plant, for example.

In one embodiment, the electronic device 1 obtains an idle thread from a preset thread connection pool, and parses a method body of the height measurement request with the idle thread. Information in the height measurement request can be obtained. The electronic device 1 further obtains a preset label and information corresponding to the preset label from the obtained information as the plant to be detected.

The preset label may be the plant identifier.

By obtaining the idle thread, from the preset thread connection pool to parse a method body of the height measurement request, not only is the time for creating the thread reduced, but also the efficiency of parsing the height measurement request can be improved. Based on a mapping relationship between the preset label and the plant to be detected, the plant to be detected can be accurately determined.

In block S11, the electronic device 1 controls the camera device 2 to capture the plant to be detected, and obtain a color image and a depth image of the plant to be detected, each of the color image and the depth image includes a plurality of plants to be detected.

In one embodiment, the camera device 2 includes dual lenses, such as the first lens 20 and the second lens 21 as mentioned above. The camera device 2 may be positioned above the plant to be detected.

In one embodiment, the color image can be a red, green, blue (RGB) three-channel color image, and the depth image can be an image of which pixel values indicate a distance from the camera device 2 to each point in a captured scene.

In one embodiment, the color image and the depth image of the plant to be detected can be obtained by performing a following procedure. A first position is determined to be the location of the plant to be detected, and the first lens 20 of the camera device 2 is controlled to move to a second position corresponding to the first position. The first lens 20 is controlled to capture the plant to be detected, and the color image is obtained. Then the second lens 21 of the camera device 2 is controlled to move to the second position, the second lens 21 is controlled to also capture the plant to be detected, and the depth image is obtained.

According to the above embodiments, the color image and the depth image of the plant to be detected can be quickly obtained.

In block S12, the electronic device 1 detects the color image by a pre-trained detection model, and obtains a plurality of detection boxes including the plurality of plants to be detected.

In one embodiment, the plurality of detection boxes is obtained by extracting features of the color image by the pre-trained detection model.

In one embodiment, before the electronic device 1 detects the color image by the pre-trained detection model, the electronic device 1 obtains all the plurality of detection boxes including the plurality of plants to be detected. Historical data is obtained by performing a web crawler method, and the historical data is inputted to a forgetting gate layer for performing a forgetting processing, and training data is obtained. The training data is divided into a training set and a validation set by utilizing a cross-validation method. Data of the training set is inputted to an input gate layer for training, and a learner is obtained. The learner is adjusted according to data of the verification set, and the pre-trained detection model is obtained.

According to the above embodiments, the pre-trained detection model suitable for the plant to be detected can be generated.

In one embodiment, before the training data is divided into the training set and the validation set with the cross-validation method, a quantity of color training images in the training data is counted. In response to the quantity of color training images in the training data is less than a preset number, the quantity of color training images in the training data is increased by using a data enhancement algorithm.

According to the above embodiments, the risk of poor generalization of the pre-trained detection model is thereby avoided.

In one embodiment, the training data is randomly divided into at least one data packet according to a preset ratio. Any one of the at least one data packet can be determined as the verification set, and the remaining data packets are determined to be the training set. The above embodiments are repeated until one of the at least one data packet is determined as the verification set.

The preset ratio can be customized, and the preset ratio is not limited in the present application.

According to the above embodiments, each of the color training images in the training data is involved in training and verification procedures, thereby improving the pre-training of the detection model.

In one embodiment, the electronic device 1 determines an optimal hyperparameter point from the verification set by performing a hyperparameter grid search method. Moreover, the electronic device 1 adjusts the learner according to the optimal hyperparameter point, and obtains the pre-trained detection model.

Specifically, the electronic device 1 splits the verification set according to a preset step size, and obtains a target subset. The electronic device 1 traverses parameters of two ends on the target subset, verifies the learner by using the parameters of the two ends on the target subset, and obtains a learning rate of each of the parameters. The electronic device 1 determines a parameter with the largest learning rate as a first hyperparameter point, and in the neighborhood of the first hyperparameter point. The electronic device 1 reduces the preset step size and continues traversing until the length of a step size after reduction is equal to a preset step length, and determines that an obtained hyperparameter point is the optimal hyperparameter point. Furthermore, the electronic device 1 adjusts the learner according to the optimal hyperparameter point, and obtains the pre-trained detection model.

The preset step length is not limited in the present application.

According to the above embodiments, the pre-trained detection model is better able for analysis of the color image.

In block S13, the electronic device 1 aligns the color image and the depth image by using an image alignment algorithm, and obtains an alignment image.

In one embodiment, the alignment image can be an image generated by merging pixels of the color image with pixels of the depth image.

In one embodiment, the electronic device 1 acquires depth pixels of the depth image, and maps the depth pixels to a preset depth coordinate system. Depth coordinates of the depth pixels can be obtained. The electronic device 1 determines global coordinates of the depth pixels according to the depth coordinates and a preset global coordinate system, and determines positions of the depth pixels on the color image according to the global coordinates. The electronic device 1 further determines color pixels corresponding to the positions on the color image, and obtains the alignment image by merging each of the depth pixels with a corresponding color pixel.

The preset depth coordinate system and the preset global coordinate system can be obtained from an open source system, or can be preset by a user according to the actual requirements, not being limited in the present application.

According to the above embodiment, the alignment image that includes a depth value can be generated, thereby aiding subsequent determination of a growth height of the plant to be detected.

In block S14, the electronic device 1 acquires a plurality of target boxes corresponding to the plurality of detection boxes from the alignment image.

In one embodiment, the electronic device 1 establishes a same coordinate system for the color image and the alignment image. The electronic device 1 determines coordinates of each of the plurality of detection boxes in the color image, and the electronic device 1 maps the coordinates of each of the plurality of detection boxes to the alignment image. The target boxes corresponding to the plurality of detection boxes are obtained.

According to the above embodiments, the plurality of target boxes of the alignment image can be accurately determined.

In block S15, the electronic device 1 determines a plurality of depth values of the plurality of target boxes based on the alignment image, and determines a quantity of the plurality of target boxes.

In one embodiment, the electronic device 1 determines pixels of any one of the target boxes, and obtains pixel depth values of the pixels from the alignment image. The electronic device 1 obtains depth values corresponding to the any one of the target boxes by calculating a sum of the pixel depth values.

The pixel depth values refer to a height of a feature point from the camera device 2. The feature point can be a pixel corresponding to the depth image of the plant to be detected.

In block S16, the electronic device 1 determines a height of the plant to be detected according to the plurality of depth values and the quantity of the plurality of target boxes.

In one embodiment, the electronic device 1 determines a camera height of a position where the camera device 2 is located. The electronic device 1 obtains a plurality of distances by subtracting the camera height from each of the depth values, and the electronic device 1 obtains a sum by calculating the plurality of distances. The electronic device 1 obtains the height of the plant to be detected by dividing the sum by the quantity of the plurality of target boxes.

According to the above embodiments, an efficiency in measuring the plant to be detected is improved, manual measurements of the plant are not required.

In one embodiment, in response that the height of the plant to be detected is less than a preset height, warning information is generated according to the height of the plant to be detected. The warning information is encrypted by using a symmetric encryption algorithm to obtain a cipher text, an alarm level of the cipher text is determined according to the plant to be detected. Then an alarm mode is determined according to the alarm level of the cipher text, and the cipher text is sent by the alarm mode.

The preset height can be set according to an expected growth rate of the plant to be detected, the above embodiments do not limit the value of the preset height. The alarm level includes level one, level two, and so on. The alarm mode includes an audio alarm using a loudspeaker, an email mode, and a telephone mode, for example.

According to the above embodiments, in response that the height of the plant to be detected is less than the preset height, the warning information can be issued. In addition, the warning information can be protected against tampering by encrypting the warning information, and security of the warning information can be improved. Moreover, the warning information can be sent in an appropriate alarm mode by determining the alarm mode according to the alarm level. Thus, the warning information can be output in a more user-friendly way.

In the above embodiments, the electronic device 1 determines the plant to be detected according to the received height measurement request, thereby accurately determining the plant to be detected, whose height needs to be measured. The electronic device 1 controls the camera device 2 to capture the plant to be detected and can quickly obtain the color image and the depth image of the plant to be detected. The electronic device 1 detects the color image by the pre-trained detection model, improving the efficiency of detecting. By determining a plurality of depth values of the plurality of target boxes based on the alignment image, and determining a quantity of the plurality of target boxes, and by determining a height of the plant to be detected according to the plurality of depth values and the quantity of the plurality of target boxes, measurement of the height of the plant is more accurate and more efficient.

Figure 3:
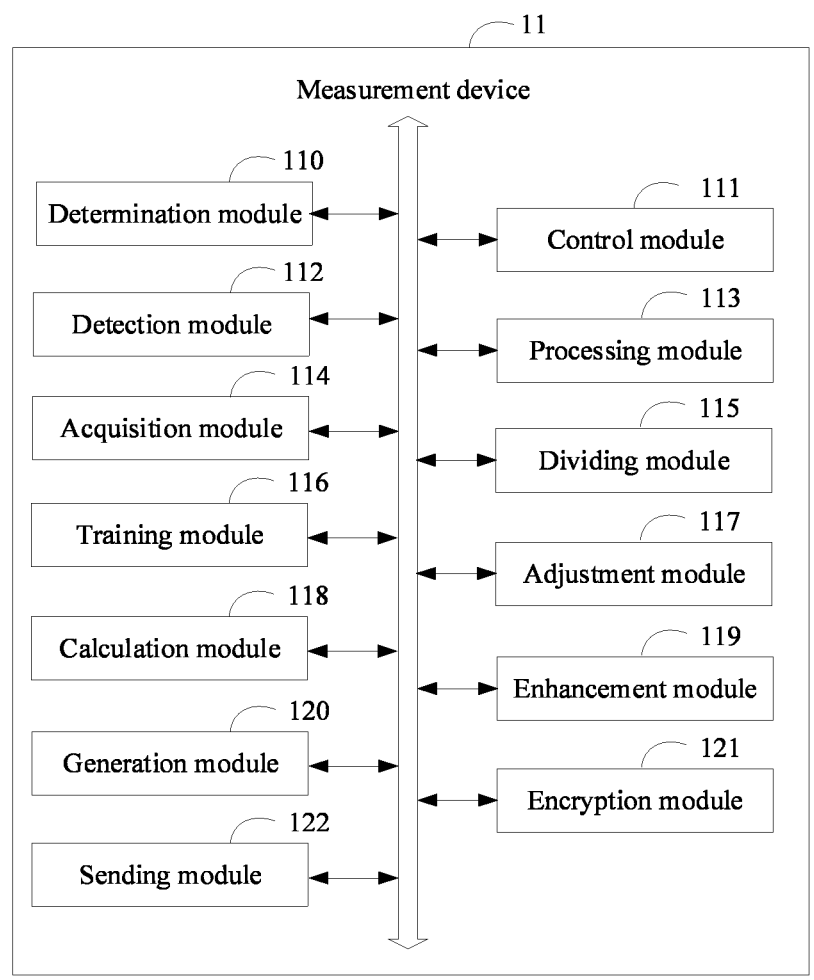
FIG. 3 is a structural diagram of a measurement device for measuring a growth height of a plant in an embodiment of the present application.

FIG. 3 is a structural diagram of a measurement device for measuring a growth height of a plant in an embodiment of the present application.

As shown in FIG. 3, a measurement device 11 for measuring a growth height of a plant includes a determination module 110, a control module 111, a detection module 112, a processing module 113, an acquisition module 114, a dividing module 115, a training module 116, an adjustment module 117, a calculation module 118, an enhancement module 119, a generation module 120, an encryption module 121, and a sending module 122. The modules in the present application refer to one of a series of computer-readable instruction segments that can be executed by at least one processor and that are capable of performing preset functions, which are stored in a storage device. In some embodiments, the functions of each module will be described.

In response to a received height measurement request, the determination module 110 determines a plant to be detected according to the received height measurement request.

In one embodiment, information carried in the height measurement request includes a plant identifier, and a name of the plant to be detected, for example.

Moreover, the plant to be detected may be any plant that needs to be analyzed for daily growth, such as roses, sunflowers, or rice plant, for example.

In one embodiment, the determination module 110 obtains an idle thread from a preset thread connection pool, and parses a method body of the height measurement request with the idle thread. Information in the height measurement request can be obtained. The determination module 110 further a preset label and obtains information corresponding to the preset label from the obtained information as the plant to be detected.

The preset label may be the plant identifier.

By obtaining the idle thread, from the preset thread connection pool to parse a method body of the height measurement request, not only is the time for creating the thread reduced, but also the efficiency of parsing the height measurement request can be improved. Based on a mapping relationship between the preset label and the plant to be detected, the plant to be detected can be accurately determined.

The control module 111 controls the camera device 2 to capture the plant to be detected, and obtain a color image and a depth image of the plant to be detected, each of the color image and the depth image includes a plurality of plants to be detected.

In one embodiment, the camera device 2 includes dual lenses, such as the first lens 20 and the second lens 21 as mentioned above. The camera device 2 may be positioned above the plant to be detected.

In one embodiment, the color image can be a red, green, blue (RGB) three-channel color image, and the depth image can be an image of which pixel values indicate a distance from the camera device 2 to each point in a captured scene.

In one embodiment, the color image and the depth image of the plant to be detected can be obtained by performing a following procedure. A first position is determined to be the location of the plant to be detected, and the first lens 20 of the camera device 2 is controlled to move to a second position corresponding to the first position. The first lens 20 is controlled to capture the plant to be detected, and the color image is obtained. Then the second lens 21 of the camera device 2 is controlled to move to the second position, the second lens 21 is controlled to also capture the plant to be detected, and the depth image is obtained.

According to the above embodiments, the color image and the depth image of the plant to be detected can be quickly obtained.

The detection module 112 detects the color image by a pre-trained detection model, and obtains a plurality of detection boxes including the plurality of plants to be detected.

In one embodiment, the plurality of detection boxes is obtained by extracting features of the color image by the pre-trained detection model.

In one embodiment, before the detection module 112 detects the color image by the pre-trained detection model, the detection module 112 obtains all the plurality of detection boxes including the plurality of plants to be detected.

The acquisition module 114 obtains historical data by performing a web crawler method, and the historical data is inputted to a forgetting gate layer for the processing module 113 performing a forgetting processing, and training data is obtained. The dividing module 115 divides the training data into a training set and a validation set by utilizing a cross-validation method. The training module 116 inputs data of the training set to an input gate layer for training, and a learner is obtained. The adjustment module 117 adjusts the learner according to data of the verification set, and the pre-trained detection model is obtained.

According to the above embodiments, the pre-trained detection model suitable for the plant to be detected can be generated.

In one embodiment, before the training data is divided into the training set and the validation set with the cross-validation method, the calculation module 118 counts a quantity of color training images in the training data. In response to the quantity of color training images in the training data is less than a preset number, the enhancement module 119 increases the quantity of color training images in the training data by using a data enhancement algorithm.

According to the above embodiments, the risk of poor generalization of the pre-trained detection model is thereby avoided.

In one embodiment, the training data is randomly divided into at least one data packet according to a preset ratio. Any one of the at least one data packet can be determined as the verification set, and the remaining data packets are determined to be the training set. The above embodiments are repeated until one of the at least one data packet is determined as the verification set.

The preset ratio can be customized, and the preset ratio is not limited in the present application.

According to the above embodiments, each of the color training images in the training data is involved in training and verification procedures, thereby improving the pre-training of the detection model.

In one embodiment, the adjustment module 117 determines an optimal hyperparameter point from the verification set by performing a hyperparameter grid search method. Moreover, the adjustment module 117 adjusts the learner according to the optimal hyperparameter point, and obtains the pre-trained detection model.

Specifically, the adjustment module 117 splits the verification set according to a preset step size, and obtains a target subset. The adjustment module 117 traverses parameters of two ends on the target subset, verifies the learner by using the parameters of the two ends on the target subset, and obtains a learning rate of each of the parameters. The adjustment module 117 determines a parameter with the largest learning rate as a first hyperparameter point, and in the neighborhood of the first hyperparameter point. The adjustment module 117 reduces the preset step size and continues traversing until the length of a step size after reduction is equal to a preset step length, and determines that an obtained hyperparameter point is the optimal hyperparameter point. Furthermore, the adjustment module 117 adjusts the learner according to the optimal hyperparameter point, and obtains the pre-trained detection model.

The preset step length is not limited in the present application.

According to the above embodiments, the pre-trained detection model is better able for analysis of the color image.

The processing module 113 aligns the color image and the depth image by using an image alignment algorithm, and obtains an alignment image.

In one embodiment, the alignment image can be an image generated by merging pixels of the color image with pixels of the depth image.

In one embodiment, the processing module 113 acquires depth pixels of the depth image, and maps the depth pixels to a preset depth coordinate system. Depth coordinates of the depth pixels can be obtained. The processing module 113 determines global coordinates of the depth pixels according to the depth coordinates and a preset global coordinate system, and determines positions of the depth pixels on the color image according to the global coordinates. The processing module 113 further determines color pixels corresponding to the positions on the color image, and obtains the alignment image by merging each of the depth pixels with a corresponding color pixel.

The preset depth coordinate system and the preset global coordinate system can be obtained from an open source system, or can be preset by a user according to the actual requirements, not being limited in the present application.

According to the above embodiment, the alignment image that includes a depth value can be generated, thereby aiding subsequent determination of a growth height of the plant to be detected.

The acquisition module 114 acquires a plurality of target boxes corresponding to the plurality of detection boxes from the alignment image.

In one embodiment, the acquisition module 114 establishes a same coordinate system for the color image and the alignment image. The acquisition module 114 determines coordinates of each of the plurality of detection boxes in the color image, and the acquisition module 114 maps the coordinates of each of the plurality of detection boxes to the alignment image. The target boxes corresponding to the plurality of detection boxes are obtained.

According to the above embodiments, the plurality of target boxes of the alignment image can be accurately determined.

The determination module 110 determines a plurality of depth values of the plurality of target boxes based on the alignment image, and determines a quantity of the plurality of target boxes.

In one embodiment, the determination module 110 determines pixels of any one of the target boxes, and obtains pixel depth values of the pixels from the alignment image. The determination module 110 obtains depth values corresponding to the any one of the target boxes by calculating a sum of the pixel depth values.

The pixel depth values refer to a height of a feature point from the camera device 2. The feature point can be a pixel corresponding to the depth image of the plant to be detected.

The determination module 110 determines a height of the plant to be detected according to the plurality of depth values and the quantity of the plurality of target boxes.

In one embodiment, the determination module 110 determines a camera height of a position where the camera device 2 is located. The determination module 110 obtains a plurality of distances by subtracting the camera height from each of the depth values, and the determination module 110 obtains a sum by calculating the plurality of distances. The determination module 110 obtains the height of the plant to be detected by dividing the sum by the quantity of the plurality of target boxes.

According to the above embodiments, an efficiency in measuring the plant to be detected is improved, manual measurements of the plant are not required.

In one embodiment, in response that the height of the plant to be detected is less than a preset height, the generation module 120 generates warning information according to the height of the plant to be detected. The encryption module 121 encrypts the warning information by using a symmetric encryption algorithm to obtain a cipher text. An alarm level of the cipher text is determined according to the plant to be detected. Then an alarm mode is determined according to the alarm level of the cipher text, and the sending module 122 sent the cipher text by the alarm mode.

The preset height can be set according to an expected growth rate of the plant to be detected, the above embodiments do not limit the value of the preset height. The alarm level includes level one, level two, and so on. The alarm mode includes an audio alarm using a loudspeaker, an email mode, and a telephone mode, for example.

According to the above embodiments, in response that the height of the plant to be detected is less than the preset height, the warning information can be issued. In addition, the warning information can be protected against tampering by encrypting the warning information, and security of the warning information can be improved. Moreover, the warning information can be sent in an appropriate alarm mode by determining the alarm mode according to the alarm level. Thus, the warning information can be output in a more user-friendly way.

In the above embodiments, the electronic device 1 determines the plant to be detected according to the received height measurement request, thereby accurately determining the plant to be detected, whose height needs to be measured. The electronic device 1 controls the camera device 2 to capture the plant to be detected and can quickly obtain the color image and the depth image of the plant to be detected. The electronic device 1 detects the color image by the pre-trained detection model, improving the efficiency of detecting. By determining a plurality of depth values of the plurality of target boxes based on the alignment image, and determining a quantity of the plurality of target boxes, and by determining a height of the plant to be detected according to the plurality of depth values and the quantity of the plurality of target boxes, measurement of the height of the plant is more accurate and more efficient.

Figure 4:
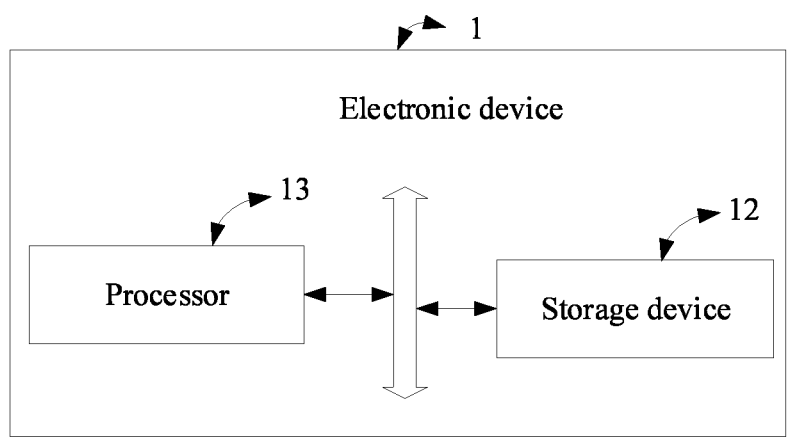
FIG. 4 is a structural diagram of an electronic device housing the measurement device in an embodiment of the present application.

FIG. 4 is a structural diagram of an electronic device housing the measurement device in an embodiment of the present application. The electronic device 1 may include a storage device 12, at least one processor 13, and computer-readable instructions stored in the storage device 12 and executable by the at least one processor 13, for example, a growth height of a plant determination programs.

Those skilled in the art will understand that FIG. 4 is only an example of the electronic device 1 and does not constitute a limitation on the electronic device 1. Another electronic device 1 may include more or fewer components than shown in the figures or may combine some components or have different components. For example, the electronic device 1 may further include an input/output device, a network access device, a bus, and the like.

The at least one processor 13 can be a central processing unit (CPU), or can be another general-purpose processor, digital signal processor (DSPs), application-specific integrated circuit (ASIC), Field-Programmable Gate Array (FPGA), another programmable logic device, discrete gate, transistor logic device, or discrete hardware component, etc. The processor 13 can be a microprocessor or any conventional processor. The processor 13 is a control center of the electronic device 1 and connects various parts of the entire electronic device 1 by using various interfaces and lines.

The processor 13 executes the computer-readable instructions to implement the method for determining a growth height of a plant as mentioned in the above embodiments, such as in block S10-S16 shown in FIG. 2. Alternatively, the processor 13 executes the computer-readable instructions to implement the functions of the modules/units in the foregoing device embodiments, such as the modules 110-122 in FIG. 3.

For example, the computer-readable instructions can be divided into one or more modules/units, and the one or more modules/units are stored in the storage device 12 and executed by the at least one processor 13. The one or more modules/units can be a series of computer-readable instruction segments capable of performing specific functions, and the instruction segments are used to describe execution processes of the computer-readable instructions in the electronic device 1. For example, the computer-readable instruction can be divided into the determination module 110, the control module 111, the detection module 112, the processing module 113, the acquisition module 114, the dividing module 115, the training module 116, the adjustment module 117, the calculation module 118, the enhancement module 119, the generation module 120, the encryption module 121, and the sending module 122 as shown in FIG. 3.

The storage device 12 can be configured to store the computer-readable instructions and/or modules/units. The processor 13 may run or execute the computer-readable instructions and/or modules/units stored in the storage device 12 and may call up data stored in the storage device 12 to implement various functions of the electronic device 1. The storage device 12 mainly includes a storage program area and a storage data area. The storage program area may store an operating system, and an application program required for at least one function (such as a sound playback function, an image playback function, for example), for example. The storage data area may store data (such as audio data, phone book data, for example) created according to the use of the electronic device 1. In addition, the storage device 12 may include a high-speed random access memory, and may also include a non-transitory storage medium, such as a hard disk, an internal memory, a plug-in hard disk, a smart media card (SMC), a secure digital (SD) Card, a flashcard, at least one disk storage device, a flash memory device, or another non-transitory solid-state storage device.

The storage device 12 may be an external memory and/or an internal memory of the electronic device 1. The storage device 12 may be a memory in a physical form, such as a memory stick, a Trans-flash Card (TF card), for example.

When the modules/units integrated into the electronic device 1 are implemented in the form of software functional units having been sold or used as independent products, they can be stored in a non-transitory readable storage medium. Based on this understanding, all or part of the processes in the methods of the above embodiments implemented by the present disclosure can also be completed by related hardware instructed by computer-readable instructions. The computer-readable instructions can be stored in a non-transitory readable storage medium. The computer-readable instructions, when executed by the processor, may implement the steps of the foregoing method embodiments. The computer-readable instructions include computer-readable instruction codes, and the computer-readable instruction codes can be in a source code form, an object code form, an executable file, or some intermediate form. The non-transitory readable storage medium can include any entity or device capable of carrying the computer-readable instruction code, such as a recording medium, a U disk, a mobile hard disk, a magnetic disk, an optical disk, a computer memory, or a read-only memory (ROM).

With reference to FIG. 2, the storage device 12 in the electronic device 1 stores a plurality of instructions to implement a method for measuring a growth height of a plant, and the processor 13 can execute the multiple instructions to: in response to a received height measurement request, determining a plant to be detected according to the received height measurement request; controlling the camera device to capture the plant to be detected, and obtaining a color image and a depth image of the plant to be detected, each of the color image and the depth image comprising a plurality of plants to be detected; detecting the color image by a pre-trained detection model, and obtaining a plurality of detection boxes comprising the plurality of plants to be detected; aligning the color image and the depth image by an image alignment algorithm and obtaining an alignment image; acquiring a plurality of target boxes corresponding to the plurality of detection boxes from the alignment image; determining a plurality of depth values of the plurality of target boxes based on the alignment image, and determining a quantity of the plurality of target boxes; and determining a height of the plant to be detected according to the plurality of depth values and the quantity of the plurality of target boxes.

The computer-readable instructions are executed by the processor 13 to realize the functions of each module/unit in the above-mentioned device embodiments, which will not be repeated here.

In the several embodiments provided in the preset application, the disclosed electronic device and method can be implemented in other ways. For example, the embodiments of the devices described above are merely illustrative. For example, divisions of the modules are only logical function divisions, and there can be other manners of division in actual implementation.

In addition, each functional module in each embodiment of the present disclosure can be integrated into one processing module, or can be physically present separately in each unit or two or more modules can be integrated into one module. The above modules can be implemented in a form of hardware or in a form of a software functional unit.

Therefore, the present embodiments are considered as illustrative and not restrictive, and the scope of the present disclosure is defined by the appended claims. All changes and variations in the meaning and scope of equivalent elements are included in the present disclosure. Any reference sign in the claims should not be construed as limiting the claim.

Moreover, the word "comprising" does not exclude other units nor does the singular exclude the plural. A plurality of units or devices stated in the system claims may also be implemented by one unit or device through software or hardware. Words such as "first" and "second" are used to indicate names, but not in any particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

What is claimed is:

1. A method for measuring a growth height of a plant, the method being implemented by an electronic device, which is connected to a camera device, the method comprising:
   in response to a received height measurement request, determining a plant to be detected according to the received height measurement request;
   controlling the camera device to capture the plant to be detected, and obtaining a color image and a depth image of the plant to be detected, each of the color image and the depth image comprising a plurality of plants to be detected;
   detecting the color image by a pre-trained detection model, and obtaining a plurality of detection boxes comprising the plurality of plants to be detected;
   aligning the color image and the depth image by an image alignment algorithm and obtaining an alignment image, comprising: acquiring depth pixels of the depth image; mapping the depth pixels to a preset depth coordinate system, and obtaining depth coordinates of the depth pixels; determining global coordinates of the depth pixels according to the depth coordinates and a preset global coordinate system; determining positions of the depth pixels on the color image according to the global coordinates, determining color pixels corresponding to the positions on the color image; and obtaining the alignment image by merging each of the depth pixels with corresponding color pixel;
   acquiring a plurality of target boxes corresponding to the plurality of detection boxes from the alignment image;
   determining a plurality of depth values of the plurality of target boxes based on the alignment image, and determining a quantity of the plurality of target boxes; and
   determining a height of the plant to be detected according to the plurality of depth values and the quantity of the plurality of target boxes.

2. The method for measuring a growth height of a plant of claim 1, wherein determining the plant to be detected according to the received height measurement request comprises:
   obtaining an idle thread from a preset thread connection pool;
   parsing a method body of the height measurement request with the idle thread, and obtaining information carried in the height measurement request; and
   obtaining a preset label, and obtaining information corresponding to the preset label from the obtained information as the plant to be detected.

3. The method for measuring a growth height of a plant of claim 1, wherein controlling the camera device to capture the plant to be detected, and obtaining the color image and the depth image of the plant to be detected comprises:
   determining a first position where the plant to be detected is located;
   controlling a first lens of the camera device move to a second position corresponding to the first position, and controlling the first lens capture the plant to be detected, and obtaining the color image; and
   controlling a second lens of the camera device move to the second position, and controlling the second lens capture the plant to be detected, and obtaining the depth image.

4. The method for measuring a growth height of a plant of claim 1, before detecting the color image by the pre-trained detection model, and obtaining the plurality of detection boxes comprising the plurality of plants to be detected, further comprising:

obtaining historical data by performing a web crawler method;
inputting the historical data to a forgetting gate layer for performing a forgetting processing, and obtaining training data;
dividing the training data into a training set and a validation set with a cross-validation method;
inputting data of the training set to an input gate layer for training, and obtaining a learner; and
adjusting the learner according to data of the verification set, and obtaining the pre-trained detection model.

5. The method for measuring a growth height of a plant of claim 1, wherein acquiring the plurality of target boxes corresponding to the plurality of detection boxes from the alignment image comprises:
establishing a same coordinate system for the color image and the alignment image;
determining coordinates of each of the plurality of detection boxes in the color image; and
mapping the coordinates of each of the plurality of detection boxes to the alignment image, and obtaining the target boxes corresponding to the plurality of detection boxes.

6. The method for measuring a growth height of a plant of claim 1, wherein determining the height of the plant to be detected according to the plurality of depth values and the quantity of the plurality of target boxes comprises:
determining a camera height where the camera device is located;
obtaining a plurality of distances by subtracting the camera height from each of the depth values;
obtaining a sum by calculating the plurality of distances; and
obtaining the height of the plant to be detected by dividing the sum by the quantity of the plurality of target boxes.

7. An electronic device comprising:
a processor; and
a storage device storing a plurality of instructions, which when executed by the processor, cause the processor to:
in response to a received height measurement request, determine a plant to be detected according to the received height measurement request;
control the camera device to capture the plant to be detected, and obtain a color image and a depth image of the plant to be detected, each of the color image and the depth image comprising a plurality of plants to be detected;
detect the color image by a pre-trained detection model, and obtain a plurality of detection boxes comprising the plurality of plants to be detected;
align the color image and the depth image by an image alignment algorithm and obtain an alignment image, comprising: acquire depth pixels of the depth image; map the depth pixels to a preset depth coordinate system, and obtain depth coordinates of the depth pixels; determine global coordinates of the depth pixels according to the depth coordinates and a preset global coordinate system; determine positions of the depth pixels on the color image according to the global coordinates, and determine color pixels corresponding to the positions on the color image; obtain the alignment image by merging each of the depth pixels with corresponding color pixel;
acquire a plurality of target boxes corresponding to the plurality of detection boxes from the alignment image;
determine a plurality of depth values of the plurality of target boxes based on the alignment image, and determine a quantity of the plurality of target boxes; and
determine a height of the plant to be detected according to the plurality of depth values and the quantity of the plurality of target boxes.

8. The electronic device of claim 7, wherein the processor is further caused to:
obtain an idle thread from a preset thread connection pool;
parse a method body of the height measurement request with the idle thread, and obtain information carried in the height measurement request; and
obtain a preset label, and obtain information corresponding to the preset label from the obtained information as the plant to be detected.

9. The electronic device of claim 7, wherein the processor is further caused to:
determine a first position where the plant to be detected is located;
control a first lens of the camera device move to a second position corresponding to the first position, and control the first lens capture the plant to be detected, and obtain the color image; and
control a second lens of the camera device move to the second position, and control the second lens capture the plant to be detected, and obtain the depth image.

10. The electronic device of claim 7, wherein the processor is further caused to:
obtain historical data by performing a web crawler method;
input the historical data to a forgetting gate layer for performing a forgetting processing, and obtain training data;
divide the training data into a training set and a validation set with a cross-validation method;
input data of the training set to an input gate layer for training, and obtain a learner; and
adjust the learner according to data of the verification set, and obtain the pre-trained detection model.

11. The electronic device of claim 7, wherein the processor is further caused to:
establish a same coordinate system for the color image and the alignment image;
determine coordinates of each of the plurality of detection boxes in the color image; and
map the coordinates of each of the plurality of detection boxes to the alignment image, and obtain the target boxes corresponding to the plurality of detection boxes.

12. The electronic device of claim 7, wherein the processor is further caused to:
determine a camera height where the camera device is located;
obtain a plurality of distances by subtracting the camera height from each of the depth values;
obtain a sum by calculating the plurality of distances; and
obtain the height of the plant to be detected by dividing the sum by the quantity of the plurality of target boxes.

13. A non-transitory storage medium having stored thereon at least one computer-readable instructions that, when executed by a processor of an electronic device, causes the processor to perform a method for measuring a growth height of a plant, the method comprising:
in response to a received height measurement request, determining a plant to be detected according to the received height measurement request;
controlling the camera device to capture the plant to be detected, and obtaining a color image and a depth image of the plant to be detected, each of the color image and the depth image comprising a plurality of plants to be detected;

detecting the color image by a pre-trained detection model, and obtaining a plurality of detection boxes comprising the plurality of plants to be detected;

aligning the color image and the depth image by an image alignment algorithm and obtaining an alignment image, comprising: acquiring depth pixels of the depth image; mapping the depth pixels to a preset depth coordinate system, and obtaining depth coordinates of the depth pixels; determining global coordinates of the depth pixels according to the depth coordinates and a preset global coordinate system; determining positions of the depth pixels on the color image according to the global coordinates, determining color pixels corresponding to the positions on the color image; and obtaining the alignment image by merging each of the depth pixels with corresponding color pixel;

acquiring a plurality of target boxes corresponding to the plurality of detection boxes from the alignment image;

determining a plurality of depth values of the plurality of target boxes based on the alignment image, and determining a quantity of the plurality of target boxes; and determining a height of the plant to be detected according to the plurality of depth values and the quantity of the plurality of target boxes.

14. The non-transitory storage medium of claim 13, wherein determining the plant to be detected according to the received height measurement request comprises:

obtaining an idle thread from a preset thread connection pool;

parsing a method body of the height measurement request with the idle thread, and obtaining information carried in the height measurement request; and obtaining a preset label, and obtaining information corresponding to the preset label from the obtained information as the plant to be detected.

15. The non-transitory storage medium of claim 13, wherein controlling the camera device to capture the plant to be detected, and obtaining the color image and the depth image of the plant to be detected comprises:

determining a first position where the plant to be detected is located;

controlling a first lens of the camera device move to a second position corresponding to the first position, and controlling the first lens capture the plant to be detected, and obtaining the color image; and controlling a second lens of the camera device move to the second position, and controlling the second lens capture the plant to be detected, and obtaining the depth image.

16. The non-transitory storage medium of claim 13, before detecting the color image by the pre-trained detection model, and obtaining the plurality of detection boxes comprising the plurality of plants to be detected, further comprising:

obtaining historical data by performing a web crawler method;

inputting the historical data to a forgetting gate layer for performing a forgetting processing, and obtaining training data;

dividing the training data into a training set and a validation set with a cross-validation method;

inputting data of the training set to an input gate layer for training, and obtaining a learner; and adjusting the learner according to data of the verification set, and obtaining the pre-trained detection model.

17. The non-transitory storage medium of claim 13, wherein acquiring the plurality of target boxes corresponding to the plurality of detection boxes from the alignment image comprises:

establishing a same coordinate system for the color image and the alignment image;

determining coordinates of each of the plurality of detection boxes in the color image; and mapping the coordinates of each of the plurality of detection boxes to the alignment image, and obtaining the target boxes corresponding to the plurality of detection boxes.

* * * * *